US012801571B2

(12) United States Patent
Shah et al.

(10) Patent No.: US 12,801,571 B2
(45) Date of Patent: Nov. 17, 2026

(54) USE FILE SYSTEM FILTERS AND FILE SYSTEM JOURNAL LOGS TO BACKUP FILES IN NATIVE FILE SYNC SYSTEM

(71) Applicant: Microsoft Technology Licensing, LLC, Redmond, WA (US)

(72) Inventors: Hardik Rajiv Shah, Seattle, WA (US); Brian Jones, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/946,490

(22) Filed: Nov. 13, 2024

(65) Prior Publication Data

US 2026/0133935 A1 May 14, 2026

(51) Int. Cl.
*G06F 16/16* (2019.01)
*G06F 16/17* (2019.01)
*G06F 16/178* (2019.01)

(52) U.S. Cl.
CPC ........ *G06F 16/162* (2019.01); *G06F 16/1734* (2019.01); *G06F 16/178* (2019.01)

(58) Field of Classification Search
USPC .......................................................... 707/821
See application file for complete search history.

(56) References Cited

U.S. PATENT DOCUMENTS

2002/0120791 A1* 8/2002 Somalwar ........... G06F 11/1435 719/330
2016/0142485 A1* 5/2016 Mitkar ................ G06F 11/1464 707/681
2018/0285201 A1* 10/2018 Bangalore ........... G06F 11/2097
2021/0311909 A1* 10/2021 Saito ..................... G06F 16/215

OTHER PUBLICATIONS

Software AG. Logical Condition Criteria. 2021, pp. 1-19. https://documentation.softwareag.com/natural/nat911mf/pg/pg_furth_lcc.htm. (Year: 2019).*

* cited by examiner

*Primary Examiner* — Shahid A Alam
(74) *Attorney, Agent, or Firm* — Scott Y. Shigeta; Newport IP, LLC

(57) ABSTRACT

Example implementations relate to methods, apparatuses, and computer-readable media for using file system filters to back up files before deletes. A cloud provider application tags a file within a local file system of a device with a tag for synchronization with a cloud file system. A filter of the local file system detects a command to delete the tagged file based on a presence of the tag. The file system blocks the command on the tagged file in response to detection by the filter and provides a notification of the command to the cloud provider application. The cloud provider application can back up the file to a cloud file system before the delete command is completed. The file system receives, in response to the notification, an approval to unblock the delete command and performs the command to delete the tagged file in the local file system.

20 Claims, 7 Drawing Sheets

USE FILE SYSTEM FILTERS AND FILE SYSTEM JOURNAL LOGS TO BACKUP FILES IN NATIVE FILE SYNC SYSTEM

BACKGROUND

Computer file systems are used to store electronic files in non-volatile memory for later access. Conventionally, a computer file system is local to a particular computer, which has limited storage space, limited availability of the files, and potential for a single point of failure. Various systems attempt to mitigate these problems of file systems.

For example, a file synchronization (sync) system makes copies of the files across devices and monitors the files for changes. A file sync system allows multiple users to share files. Uploads and downloads of files should be almost immediate to maintain synchronization, so a sync system may be resource intensive. Some implementations of file sync systems by cloud providers use a registered namespace for files to be synchronized. For example, a cloud provider namespace may refer to a folder that is continuously monitored by the system to sync files or folders. The cloud provider namespace is usually a mirrored representation of a cloud file structure. Only files within the registered name space are synchronized with the cloud provider.

As another example, a file backup system uploads files to a remote storage (e.g., the cloud), but does not sync the files with other devices. Accordingly, files in a backup system do not need to be monitored for changes. A file backup system may have no guarantee of immediate uploads. Backup files may be specific to the user device and can be represented separately in a cloud system. Backup files may not necessarily be available on other devices although a download of a copy to another device may be possible. In some implementations, a file backup system is applied to files or volumes on a system For instance, a backup system can backup an entire drive or specific folders. In some cases, a file sync system may implement a backup (e.g., by syncing the file only between a single user device and the cloud).

Sync systems and backup systems may still present difficulties for users and systems engineers. Cloud file sync systems use sync-based backups which require continuous monitoring of files and folders. These are resource intensive and are over-engineered for backups as multiple devices will not make changes at the same time and there is no need for immediate backing up of those files. Existing backup systems that provide real-time monitoring use file system journals for monitoring or take snapshots of the file system. Some backup systems do periodic monitoring, in which the latest changes to files are not guaranteed to be backed up in case of deleting or if the battery is dead. These techniques may not capture the latest changes if a file gets deleted and backup software was not running or file system journal changes have not been analyzed. The file system journal alone does not have the ability to hook into delete operations to backup changes before the delete operation. The backup system software will switch to scanning the directory when the application gets online similar to a sync system. Additionally, existing system may have no way to prioritize backups based on file edits or suggest any activity on the file.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus including: one or more memories storing computer executable instructions; and one or more processors coupled with the one or more memories and, individually or in combination, configured to: tag a file within a local file system of a device with a tag for synchronization with a cloud file system, wherein the tag includes metadata indicating a backup policy with the cloud file system and the file is outside of a cloud provider namespace; detect, at a filter of the local file system, a command to delete the tagged file based on a presence of the tag on the file; block the command on the tagged file in response to detection by the filter; provide a notification of the command to a cloud provider application; receive, in response to the notification, an approval to unblock the delete command; and perform the command to delete the tagged file in the local file system.

In some aspects, the techniques described herein relate to a method including: tagging a file within a local file system of a device with a tag for synchronization with a cloud file system, wherein the tag includes metadata indicating a backup policy with the cloud file system and the file is outside of a cloud provider namespace; detecting, by a filter of the local file system, a command to delete the tagged file based on a presence of the tag on the file; blocking the command on the tagged file in response to detection by the filter; providing a notification of the command to a cloud provider application; receiving, in response to the notification, an approval to unblock the delete command; and performing the command to delete the tagged file in the local file system.

In some aspects, the techniques described herein relate to a non-transitory computer-readable medium storing computer-executable instructions that when executed by a processor cause a computer to: tag a file within a local file system of a device with a tag for synchronization with a cloud file system, wherein the tag includes metadata indicating a backup policy with the cloud file system and the file is outside of a cloud provider namespace; detect, at a filter of the local file system, a command to delete the tagged file based on a presence of the tag on the file; block the command on the tagged file in response to detection by the filter; provide a notification of the command to a cloud provider application; receive, in response to the notification, an approval to unblock the delete command; and perform the command to delete the tagged file in the local file system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
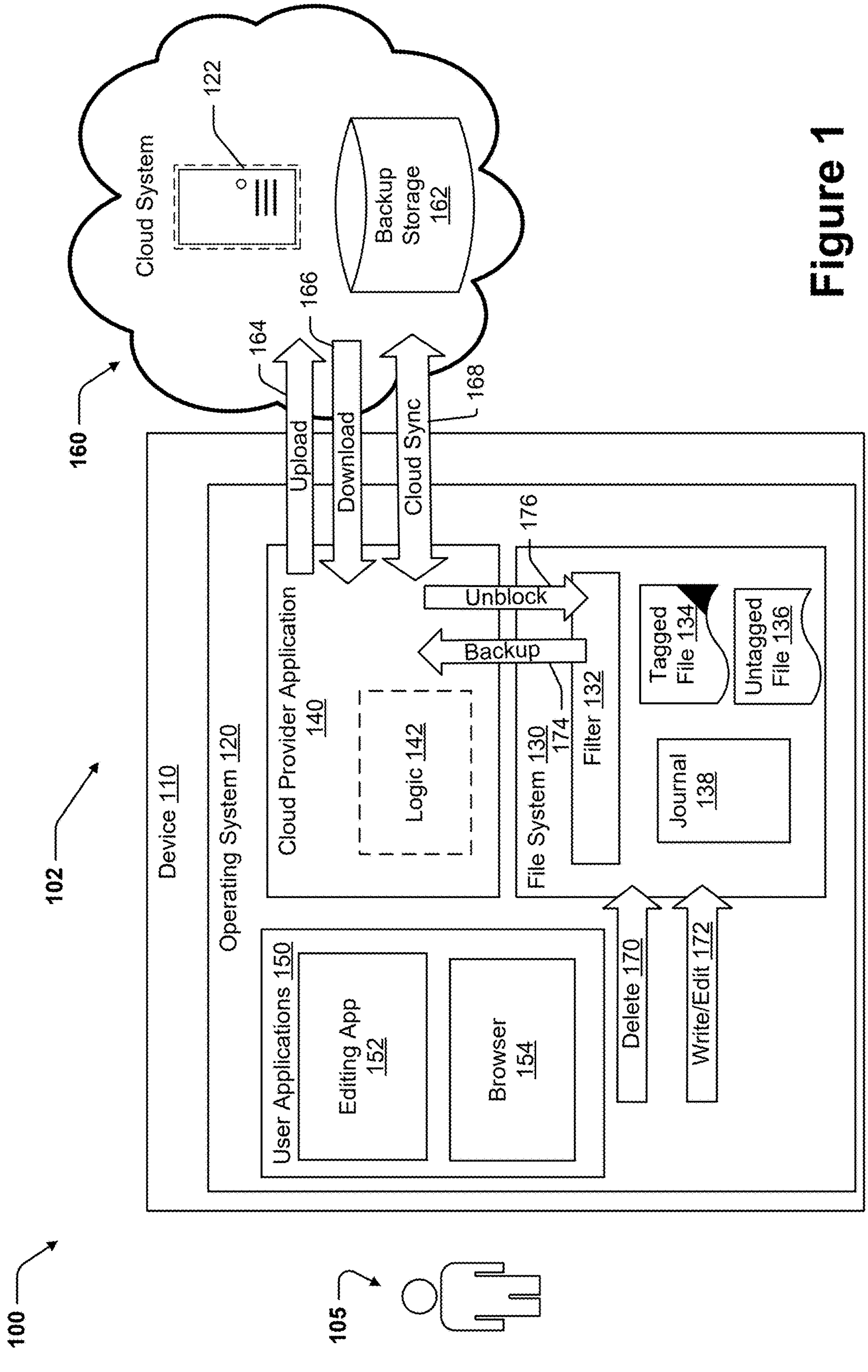
FIG. 1 is a conceptual diagram of an example of an architecture for a system to provide file backup for a device to a cloud system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a use of file system filters and file system journal logs to backup files in a native file sync system. In an aspect, instead of relying on a namespace or file location to designate files for backup, individual files and/or folders may be tagged for backup by a file system of an operating system. The file system allows applications to add filters that can intercept various requests and perform some operation on the file. For example, the file system filter may intercept commands to delete or modify a tagged file. The file system may block the command on the tagged file in response to detection by the filter and provide a notification to a cloud provider application of the delete command. The cloud provider application then has the opportunity to backup the file to the cloud storage before the file system performs the delete operation. The file system may receive a response to the notification, then unblock the command and perform the command to delete the tagged file in the local file system.

Existing file system filters in various operating systems have registration capabilities to allow cloud file providers to have the ability to fulfill content hydration requests when files do not have their contents on disk and apps reading the file via file system APIs intend to read file contents. These systems require an empty or placeholder file to exist on the disk and will only call back to the provider when the file system filter is able to read specific metadata from the placeholder file to hand context to the provider to download contents of the file. Accordingly, these existing file system filters are used to download file content rather than backup files.

In an aspect, the present disclosure allows a new way for cloud file providers to receive callbacks when a file with specific metadata is about to be deleted. Cloud file providers can save the contents of the file before the file system deletes the file. The backup requests that are forwarded to the provider may be limited to files that have specific metadata (i.e., a tag) added by the provider (via registration or other ownership mechanisms). For example, any file type can be registered with the cloud file provider, which then will have specific metadata which will exercise this flow when any app or user intent requests a delete operation on that file. Before the file system deletes the file, this filter can intercept the delete command and invoke the callback to the cloud file provider if the file has the metadata. When the cloud file provider receives the callback, it would have the ability to reject the request, which would default to normal file system behavior of proceeding with the delete. If the provider chooses the fulfill the request, it may then save the contents of the file to another location, which can be the cloud file system, before allowing the local file system to proceed with the delete.

A typical use case in a sync model includes registering the file with the provider, and the provider backs up or uploads the copy of the file to the cloud before allowing the file to be deleted. However, the system can also work if the provider wants to save the data to some cache, a backup hard drive, etc. In an aspect, the disclosure provides efficiency to know when exactly a file gets deleted without continuous monitoring of file system journals or change logs, which are resource intensive methods especially when action needs to be taken just before a delete happens. Further, the present disclosure provides a way to invoke the provider via callback in case the registered provider is not running when the file is deleted. This functionality cannot be provided using file system journals or change monitors. In a practical use case, any file can be backed up with a guarantee of saving the latest changes in an efficient way. Further, the disclosure allows files outside of a designated namespace to be backed up.

Implementations of the present disclosure may realize one or more of the following technical effects. Firstly, a file system level filter that intercepts commands for specifically tagged files allows backup operations to be performed on indicated files without increasing resource usage for other files or need for a cloud file system to continuously monitor files. Accordingly, system performance can be improved because fewer resources are used for the overhead of a backup system. The user experience can also be improved by reliably backing up files at the time of a delete command such that the most recent edits to the file are backed up. Secondly, monitoring of a file system journal to suggest prioritization of backup or syncing provides greater protection for active files when resources are limited. For instance, in a low power or poor connectivity scenario, files determined to be most important or files that have not yet been backed up may be prioritized. Accordingly, performance of the system in protecting integrity of the files may be improved.

Figure 4:
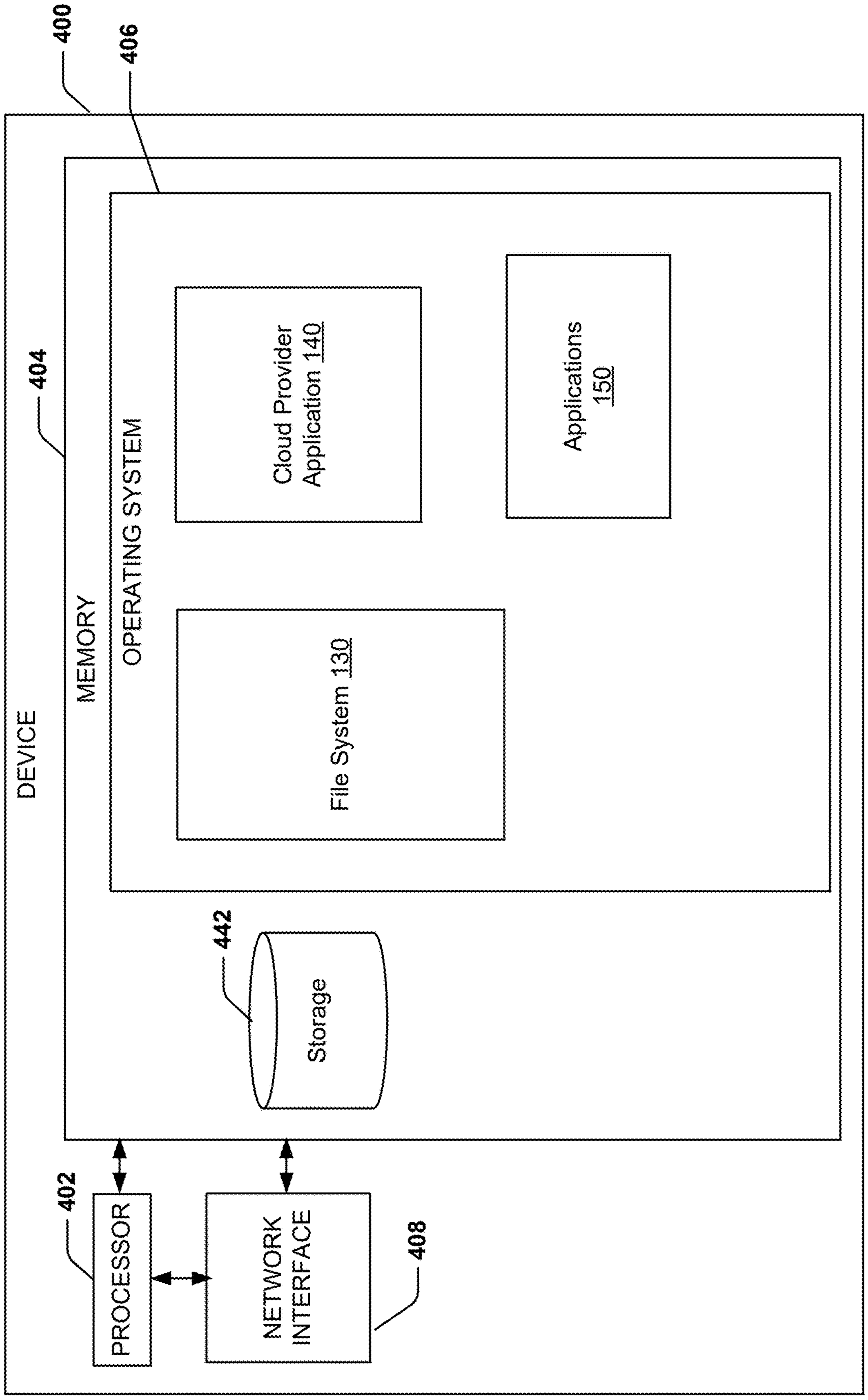
FIG. 4 is a schematic diagram of an example of an apparatus 400 (e.g., a computing device) for backing up files using a file system filter.
Figure 5:
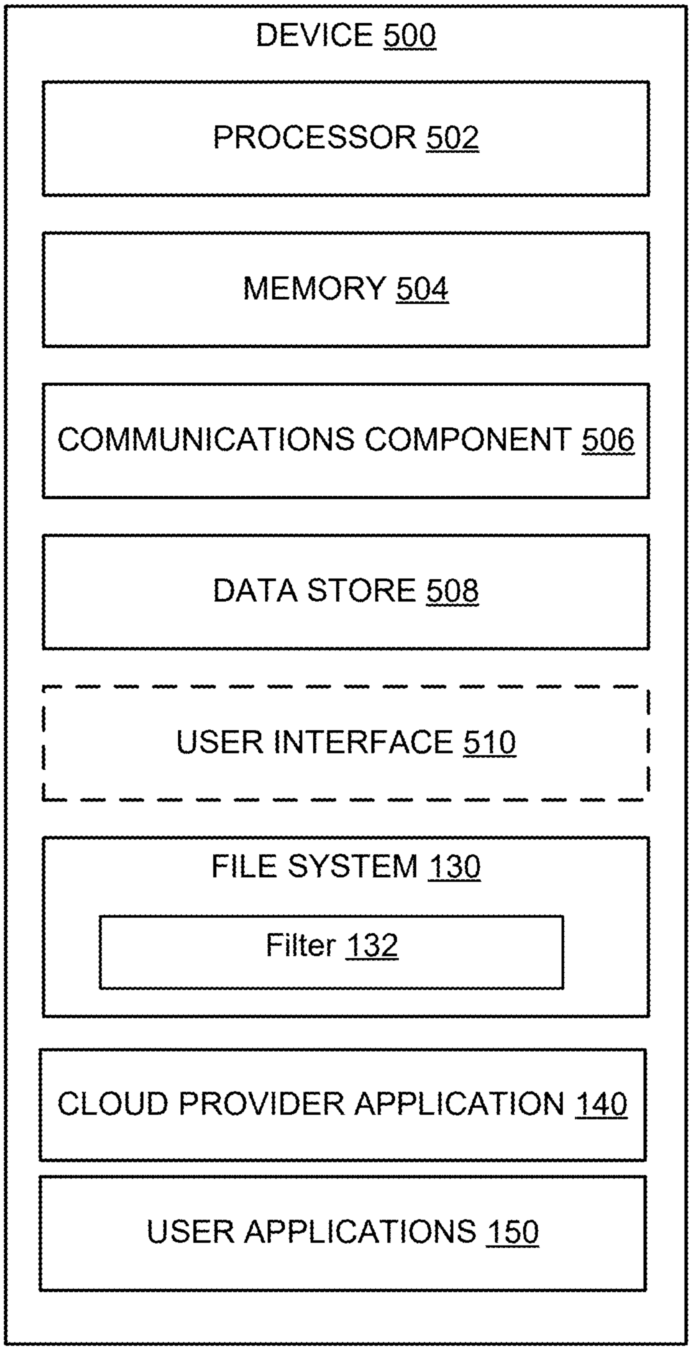
FIG. 5 illustrates an example of a user device, in accordance with aspects described herein.
Figure 6:
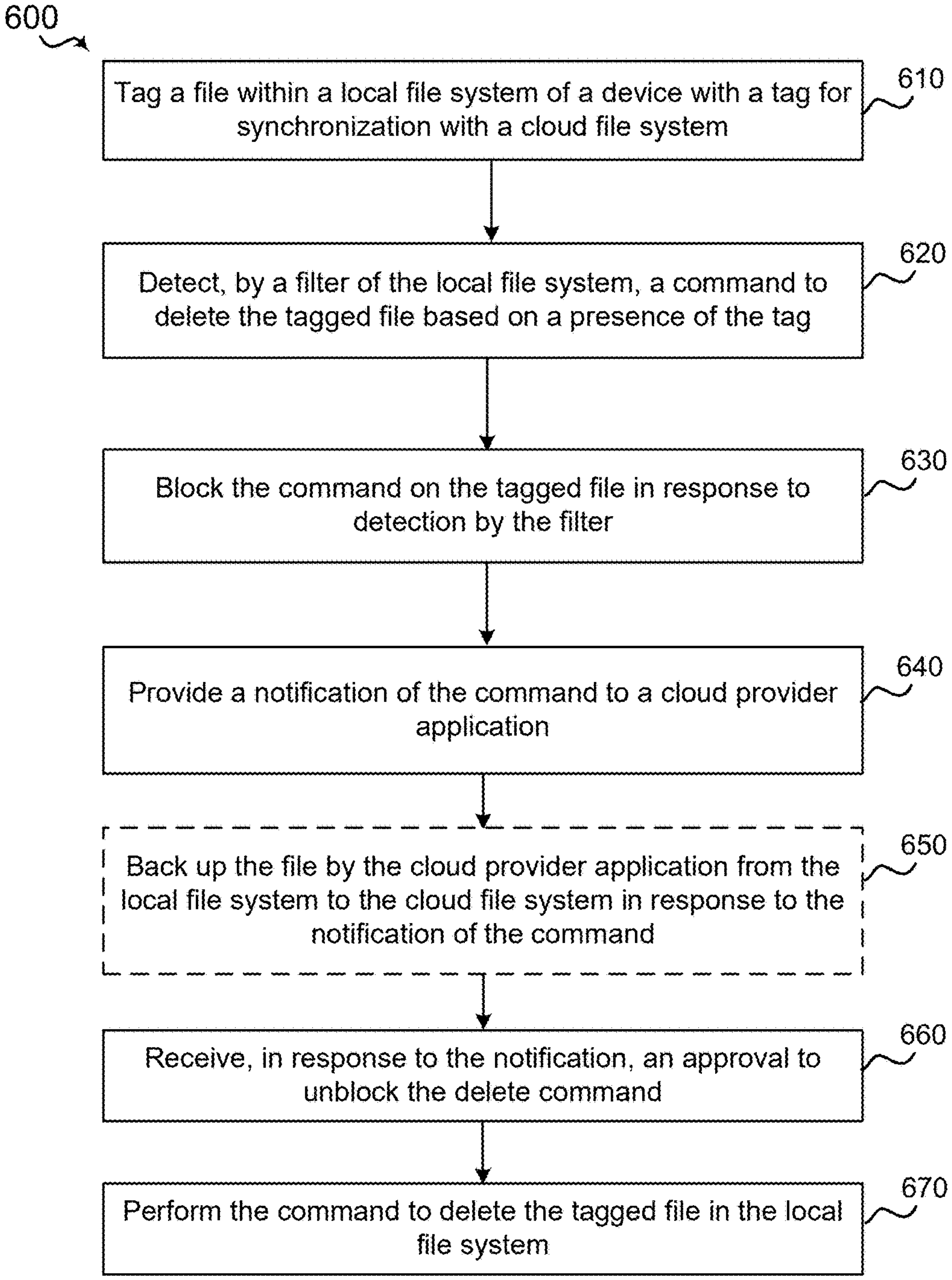
FIG. 6 is a flow diagram of an example of a method for using a file system filter to backup files, in accordance with aspects described herein.
Figure 7:
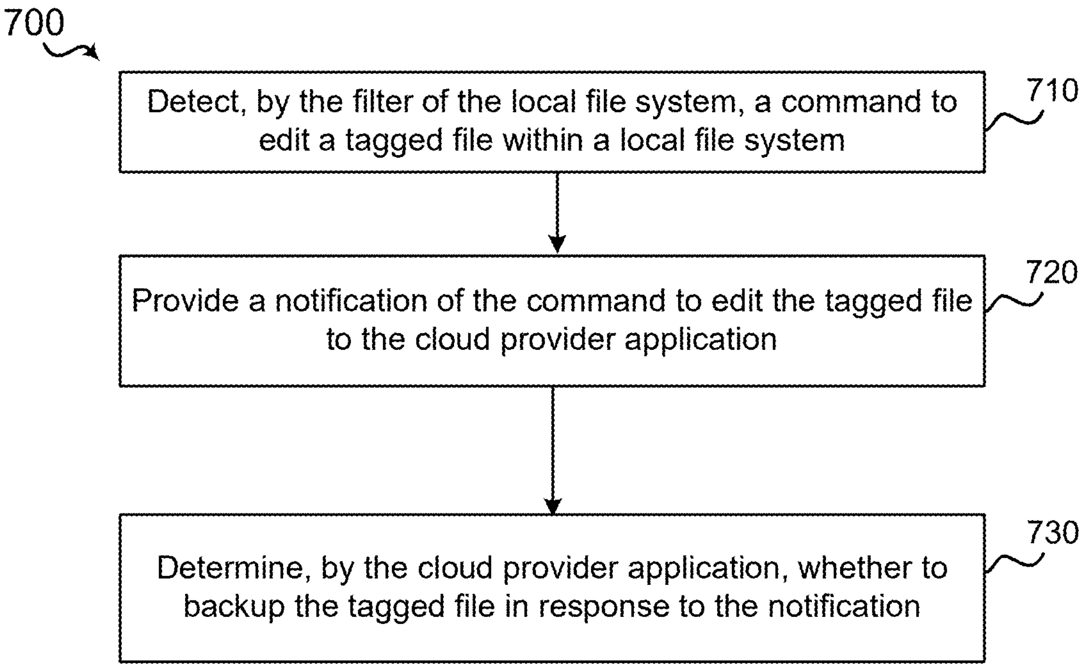
FIG. 7 is a flow diagram of an example of a method for processing edit commands for a tagged file with a file system filter, in accordance with aspects described herein.
Figure 8:
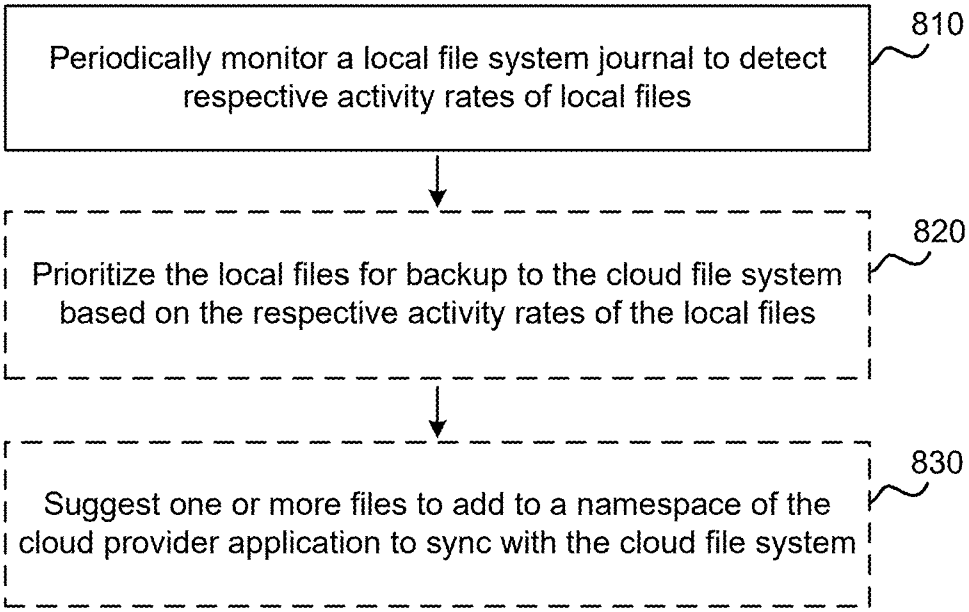
FIG. 8 is a flow diagram of an example of a method for analyzing a file system journal, in accordance with aspects described herein.

Turning now to FIGS. 1-8, examples are depicted with reference to one or more components and one or more methods that may perform the actions or operations described herein, where components and/or actions/operations in dashed line may be optional. Although the operations described below in FIGS. 6-8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a system 102 to provide file backup for a device 110 to a cloud system 160. For example, the device 110 may be a user device such as a personal computer, laptop, tablet, mobile phone, or other device that stores files and has Internet connectivity. The device 110 has an operating system 120 that includes a file system 130. The device 110 can execute a cloud provider application 140 that controls communications with the cloud system 160 to backup local files to the cloud system 160. The operating system 120 can also execute user applications 150 that allow a user 105 to interact with files such as an editing application 152 and a browser 154.

The cloud system 160 may be, for example, a cloud network including computing resources that are controlled by a network operator and accessible to public clients such as a user device 110 operated by a user 105. For example, the cloud system 160 may include a plurality of datacenters 122 that include computing resources such as computer memory and processors and a backup storage 162. The cloud system 160 may support file storage for user devices 110 on the backup storage 162. For example, the cloud system 160 may support upload operations 164, download operations 166, and/or cloud sync operations 168. An upload operation may include the user device 110 sending a file to the cloud system 160 to be written on the backup storage 162. A download operation may include the cloud system 160 sending a file from the backup storage 162 to the user device 110. A cloud sync operation 164 may include upload and/or download of a file between the cloud provider application 140 and the cloud system 160 based on monitoring of a namespace including the file that detects a difference between a copy on the user device 110 and a copy on the backup storage 162. In some implementations, the datacenters 122 may host a compute service that provides computing nodes on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter 122 and imaged with software (e.g., operating system and applications for a service). The cloud system 160 may include edge routers that connect the datacenters 122 to external networks such as internet service providers (ISPs) or other autonomous systems (ASes) that form the Internet.

In an aspect, the file system 130 includes a filter 132. Filter 132 may be a kernel-mode component (e.g., driver) that runs as part of the operating system 120 executive and can filter I/O operations for one or more file systems or file system volumes. A file system filter driver can intercept requests targeted at a file system or another file system filter driver, and extend or replace functionality provided by the original target of the request. Filters in the file system stack can intercept file level operations before the file system 130 has a chance to process them. The filter 132 is configured to receive commands to perform operations on files. For example, the commands may be from an editing application 152 or a browser 154. The filter 132 is configured with rules that can trigger actions in response to a command. In particular, the filter 132 is configured with a rule to check whether a file that is the target of a command has been tagged for backup. For example, a tagged file 134 has been tagged for backup and includes a metadata tag that indicates a backup policy for the tagged file 134, but an untagged file 136 has not been tagged.

When a delete command 170 is received by the filter 132, the filter 132 checks whether the targeted file is a tagged file 134 (i.e., has a metadata tag). If the file is tagged, the filter 132 blocks the delete command 170 and sends a backup notification 174 to the cloud provider application 140. The cloud provider application 140 may perform a cloud sync operation 164 in response to the backup notification 174. The delete command 170 may remain blocked until the cloud provider application 140 sends an unblock approval 176 (e.g., upon completion of the cloud sync operation 164). In some implementations, the blocking of the delete command 170 may be associated with a time limit, and the file system 130 may proceed with the delete command 170 if no response is received from the cloud provider application 140 within the time limit. In some implementations, the backup notification 174 may start the cloud provider application 140 when the cloud provider application 140 is not running at the time of the delete command 170.

In some implementations, the filter 132 may also be configured to intercept other commands targeting a file such as a write or edit command 172. For instance, the filter 132 may detect an edit command 172 on the tagged file 134 and send a backup notification 174 to the cloud provider application 140. In some implementations, the file system 130 may not block the edit command 172. Instead, the backup notification 174 regarding a write or edit command may allow the cloud provider application 140 to determine whether to take any action. For instance, the cloud provider application 140 may include logic 142 that determines whether the cloud provider application 140 should backup a tagged file 134 in response to a backup notification 174 indicating a write or edit command 172.

The file system 130 includes a journal 138. The journal 138 is a log maintained by the file system 130 containing all changes made to a file (e.g., tagged file 134 or untagged file 136) on a volume. For example, the journal 138 may record all delete commands 170 and write or edit commands 172. In some implementations, the journal 138 may be analyzed to provide suggestions regarding file backups. For example, the logic 142 may periodically monitor the local file system journal 138 to detect respective activity rates of local files. For instance, the activity rate for a local file may be based on a number of write or edit commands 172. The logic 142 may prioritize the local files for backup to the cloud file system based on the respective activity rates of the local files. In some implementations, the logic 142 may suggest one or more files to add to a namespace of the cloud provider application 140 to sync with the cloud file system. For instance, if a file is experiencing frequent edits, adding the file to the namespace of the cloud provider application may provide additional protection. In some implementations, the logic 142 may include a machine-learning (ML) model that has been trained to output a rating for a file based on file properties and the file journal 138. For instance, the rating may be an importance of the file or a risk of loss.

Figure 2:
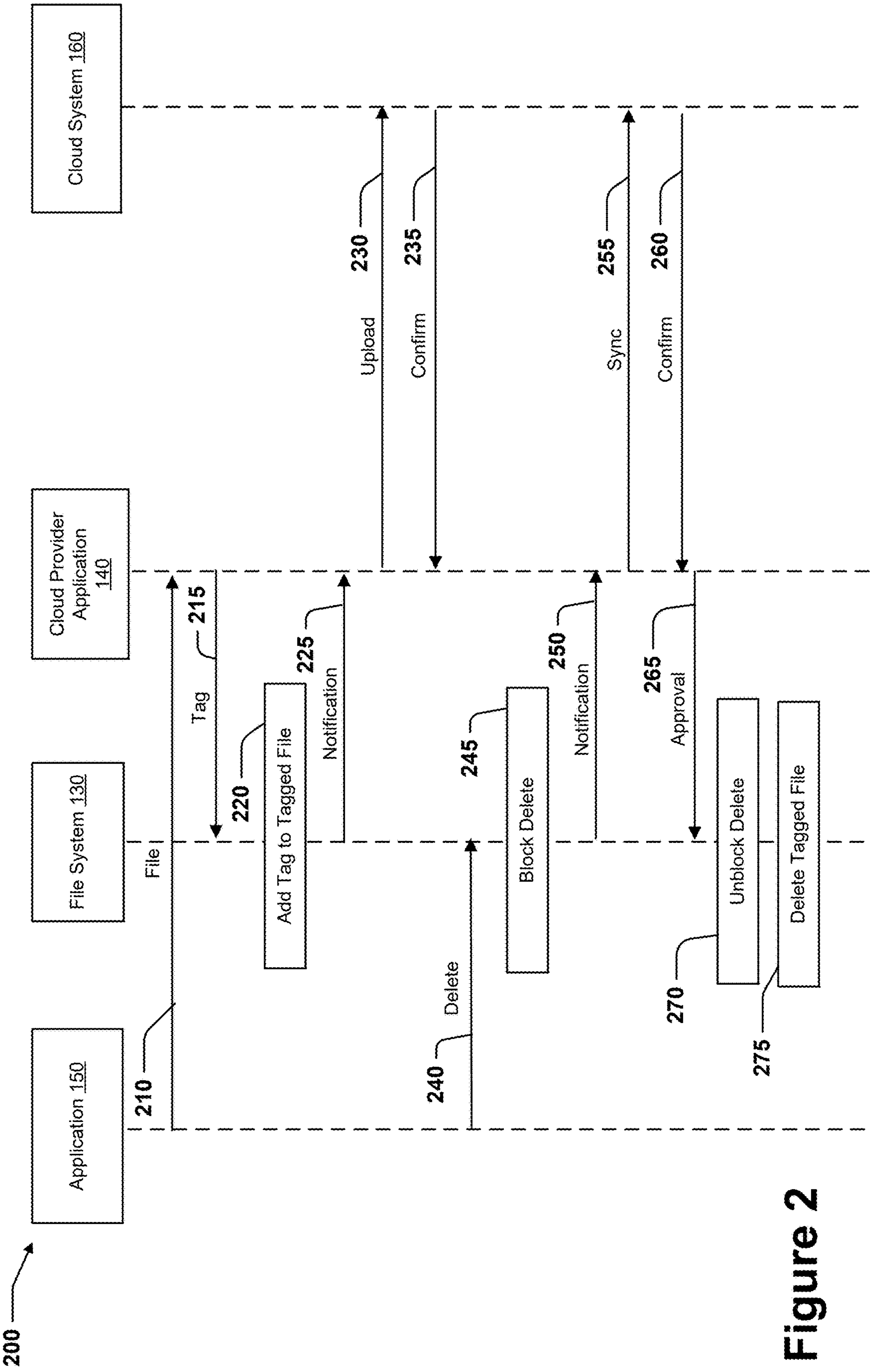
FIG. 2 is a message diagram illustrating example communications of the system, in accordance with aspects described herein.

FIG. 2 is a message diagram 200 illustrating example communications of the system 102.

A user application 150 may send an indication of a file 210 to tag to the cloud provider application 140. For example, the user application 150 may be an editing application that allows a user to create and modify files. The user 105 may indicate that a file is to be backed up by selecting an option when locally saving the file or by selecting a property of the file. In some implementations, the backup designation may operate independently of a namespace for a cloud system. That is, the file does not need to be saved in a particular location, but files saved within the namespace (e.g., for syncing) can also be backed up based on a tag.

The cloud provider application 140 may generate a tag 215 and provide the tag to the file system 130. For example, the cloud provider application 140 may call an API to the file system 130 with all relevant metadata, and the file system 130 may add the tag 215 on the file. The tag 215 may indicate that the file is to be backed up with the cloud system 160. For example, the tag 215 may include metadata for the file, for instance, located in a file header. In some implementations, the tag 215 may include information about the cloud system 160 or the tagged file 134 such as an address of the cloud system 160, a namespace for the file, credentials for accessing the file, a time of the last backup, or a backup policy.

At block 220, the file system 130 may add the tag to the file to create the tagged file 134. For example, the file system 130 may store the tag in the local storage with the tagged file 134. The file system 130 may also send a notification 225 to the cloud provider application 140 indicating that the tagged file 134 should be backed up. The cloud provider application 140 may initiate a sync operation 164 in response to the notification 225. For example, the cloud provider application 140 may upload 230 the tagged file 134 to the cloud system 160. The cloud system 160 may respond with a confirmation 235 indicating that the tagged file 134 is backed up in the backup storage 162.

At some time after the tagged file 134 is backed up, an application 150 may issue a delete command 240 to the file system 130. The application 150 that issues the delete command may not be the same application that tagged the file for backup. For example, the file may be created and backed up by the editing application 150, but the delete command 240 may be sent by a browser 154. In some implementations, the application that issues the delete command may have different protections than the application that backed up the file. For instance, the browser 154 may not have an integrated interface with the cloud provider application. The browser 154 may not present a warning to the user 105 regarding a delete operation.

The file system 130 may protect a tagged file 134 from delete operations regardless of the application that issues the delete operation. Further, the protection may operate even if the cloud provider application 140 is not running at the time of the delete operation. When the file system 130 receives the delete command 170, the filter 132 detects the tag 215. At block 245, the file system 130 blocks the delete command 240. For example, the delete command 240 may be placed in a queue to wait for an approval to unblock the command the delete the file. The file system 130 may send a notification 250 to the cloud provider application 140 indicating that the file should be backed up. The notification 250 may indicate a mandatory backup or that the file is being deleted. In some implementations, where the cloud provider application 140 is not running at the time of the notification 250, the notification 250 may cause the operating system 120 to start the cloud provider application 140.

The cloud provider application 140 may backup the tagged file 134 in response to the notification 250. For example, the cloud provider application 140 may sync 255 the file with the cloud system 160. The cloud provider application 140 may receive a confirmation 260 that the tagged file has been synced. In some implementations, the cloud provider application 140 may take another action to backup the file, for example, if Internet connectivity is unavailable. For example, the cloud provider application 140 may store the tagged file 134 on another local drive, another namespace, or in a cache. When the cloud provider application 140 has backed up the tagged file 134, the cloud provider application 140 may send an approval 265 for the file system 130 to unblock the delete command.

At block 270, the file system 130 may unblock the delete command in response to the approval 265. At block 275, the file system 130 may proceed to delete the file. In some implementations, the file system 130 may not immediately overwrite the file such that the file may be restored (e.g., via a recycle bin).

Figure 3:
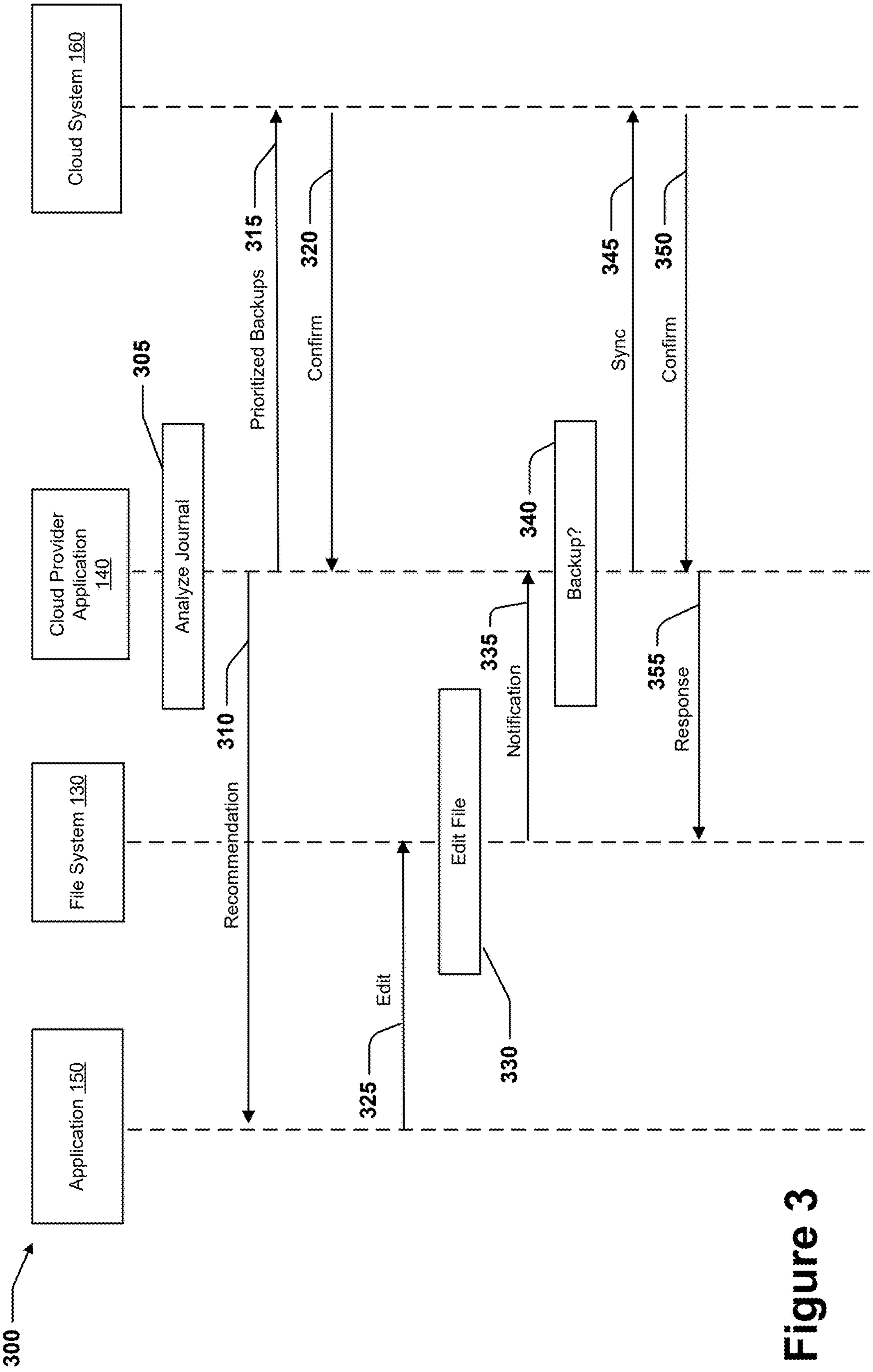
FIG. 3 is a message diagram illustrating additional example communications in the system, in accordance with aspects described herein.

FIG. 3 is a message diagram 300 illustrating additional example communications in the system 102. For example, the additional example communications may implement optional features.

In block 305, the cloud provider application 140 may analyze the file system journal 138. In some implementations, the analysis in block 305 may detect respective activity rates of local files. For example, activities may include opening a file and saving changes to the file. The activity rate may also be based on a measure of change to the file such as a change in size or a number of changes. In some implementations, the analysis in block 305 may utilize a machine-learning model trained to predict future activity rates. For example, the machine-learning model may be trained on other files in the file system journal for the user 105, or may be trained on aggregated file system journal information.

In some implementations, the cloud provider application 140 may provide a recommendation 310 of one or more files to add to a namespace of the cloud provider application to sync with the cloud file system 160. For example, the cloud provider application 140 may recommend files with a high actual or predicted activity rate. Adding such files to the namespace of the cloud file system may provide more frequent monitoring and backup. The cloud provider application 140 may also suggest tagging such files for backup.

In some implementations, the cloud provider application 140 may prioritize backups based on the analysis of the file system journal. In particular, when the device 110 has a low battery level or poor connectivity, the cloud provider application 140 may be limited in the number or size of files that can be uploaded to the cloud system 160. The cloud provider application 140 may prioritize files with a high actual or predicted activity rate for backup. The cloud provider application 140 may upload prioritized backups 315 to the cloud system 160 based on one or both of a battery level and an internet connection speed. The cloud system 160 may provide a confirmation 320 that the prioritized files have been backed up.

In an aspect, an edit command 172 may be handled differently than a delete command 170. The filter 132 may be configured to intercept edit commands 172, but does not generally block the edit commands 172. In some implementations, the filter 132 may analyze the edit command 172 to determine whether the edit command deletes content of the file (e.g., smaller file size), in which case the edit command 172 can be treated as a delete command. If the edit command does not delete content, at block 330, the file system 130 may edit the file. The file system 130 may also send a notification 335 to the cloud provider application 140. The cloud provider application 140 may determine whether to backup the tagged file in response to the notification. For example, the cloud provider application 140 may execute logic 142 to determine whether the tagged file 134 should be backed up. If the cloud provider application 140 determines to backup the tagged file 134, the client application may sync the tagged file 134 with the cloud system 160. The cloud system 160 may provide a confirmation 350 that the file has been backed up. The cloud provider application 140 may provide a response 355 to the file system 130.

FIG. 4 is a schematic diagram of an example of an apparatus 400 (e.g., a computing device) for providing reusable user interface components for interaction with a generative AI model. The apparatus 400 may be implemented as one or more computing devices in the system 102 such as the user device 110.

In an example, the apparatus 400 includes at least one processor 402 and a memory 404 configured to execute or store instructions or other parameters related to providing an operating system 406, which can execute one or more applications or processes, such as, but not limited to, the file system 130, the cloud provider application 140, and user application 150. For example, processors 402 and memory 404 may be separate components communicatively coupled by a bus (e.g., on a motherboard or other portion of a computing device, on an integrated circuit, such as a system on a chip (SoC), etc.), components integrated within one another (e.g., a processor 402 can include the memory 404 as an on-board component), and/or the like. Memory 404 may store instructions, parameters, data structures, etc. for use/execution by processor 402 to perform functions described herein. In some implementations, the memory 404 includes the storage 442 for use by the file system 130. Further, the apparatus 400 may include a network interface 408 configured to communicate with one or more networks. For example, the network interface may be a wired or wireless modem that processes signals at one or more layers of a network protocol stack. In some implementations, the network interface 408 facilitates communication of Internet protocol (IP) packets between the apparatus 400 and the cloud system 160.

FIG. 5 illustrates an example of a user device 500. The user device 500 may be an example of the user device 110. In one aspect, device 500 includes processor 502, which may be similar to processor 402 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 further includes memory 504, which may be similar to memory 404 such as for storing local versions of operating systems (or components thereof) and/or applications being executed by processor 502, such as the file system 130, cloud provider application 140, or user applications 150, etc. Memory 504 can include a type of memory usable by a computer, such as random access memory (RAM), read only memory (ROM), tapes, magnetic discs, optical discs, volatile memory, non-volatile memory, and any combination thereof. The processor 502 may execute instructions stored on the memory 504 to cause the device 500 to perform the methods discussed below with respect to FIGS. 6-8.

Further, device 500 includes a communications component 506 that provides for establishing and maintaining communications with one or more other devices, parties, entities, etc. utilizing hardware, software, and services as described herein. Communications component 506 carries communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc. not currently being executed by processor 502. In addition, data store 508 may be a data repository for the cloud provider application 140.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 additionally includes the file system 130, cloud provider application 140, and user applications 150 for backing up files using a file system filter.

FIG. 6 is a flow diagram of an example of a method 600 for using a file system filter to backup files. For example, the method 600 can be performed by the system 102, the user device 110, or the apparatus 400 and/or one or more components thereof to backup tagged files 134 to a cloud system 160.

At block 610, the method 600 includes tagging a file within a local file system of a device with a tag for synchronization with a cloud file system. For example, in an aspect, apparatus 400, processor 402, memory 404, and/or cloud provider application 140 may be configured to or may comprise means for tagging a file within a local file system of a device with a tag for synchronization with a cloud file system. For example, cloud provider application 140 may receive an indication of an untagged file 136 from a user application 150 and provide the tag 215 to the file system 130 to tag the untagged file 136 to create a tagged file 134. The tag includes metadata indicating a backup policy with the cloud file system and the file is outside of a cloud provider namespace.

At block 620, the method 600 includes detecting, by a filter of the local file system, a command to delete the tagged file based on the presence of the tag on the file. For example, in an aspect, apparatus 400, processor 402, memory 404, and/or filter 132 may be configured to or may comprise means for detecting a command to delete the tagged file based on the presence of the tag on the file. For example, the filter 132 may be configured to check each command on a file to determine whether the file is a tagged file 134 (i.e., the file includes a tag 215). The filter 132 may also be configured to detect whether a type of the command is a delete command.

At block 630, the method 600 includes blocking the command on the tagged file in response to detection by the filter. For example, in an aspect, apparatus 400, processor 402, memory 404, and/or the file system 130 may be configured to or may comprise means for blocking the command on the tagged file in response to detection by the filter. For example, the file system 130 may block the delete command 170 in response to detection by the filter 132.

At block 640, the method 600 includes providing a notification of the command to a cloud provider application. For example, in an aspect, apparatus 400, processor 402, memory 404, and/or the file system 130 may be configured to or may comprise means for providing a notification of the command to a cloud provider application. For example, the file system 130 may provide a notification 174 of the command to a cloud provider application 140.

At block 650, the method 600 may optionally include backing up the file by the cloud provider application from the local file system to the cloud file system in response to the notification of the command. For example, in an aspect, apparatus 400, processor 402, memory 404, and/or the cloud provider application 140 may be configured to or may comprise means for backing up the file from the local file system to the cloud file system in response to the notification of the command. For example, the cloud provider application 140 may upload or sync the tagged file 134 from the local file system 130 to the cloud file system 160 in response to the notification 174 of the command. In some implementations, the cloud provider application 140 may locally backup the tagged file 134, for example, if an Internet connection is not available.

At block 660, the method 600 may include receiving, in response to the notification, an approval to unblock the delete command. For example, in an aspect, apparatus 400, processor 402, memory 404, and/or the file system 130 may be configured to or may comprise means for receiving, in response to the notification, an approval to unblock the delete command. For example, the file system 130 may receive the approval 176 to unblock the delete command 170.

At block 670, the method 700 includes performing the command to delete the tagged file in the local file system. For example, in an aspect, apparatus 400, processor 402, memory 404, and/or the file system 130 may be configured to or may comprise means for performing the command 170 to delete the tagged file 134 in the local file system. For example, the file system 130 may remove the tagged file 134 from a file system table. In some implementations, the file system 130 may designate the tagged file 134 for deletion in a recycle bin.

FIG. 7 is a flow diagram of an example of a method 700 for processing edit commands for a tagged file with a file system filter. For example, the method 700 can be performed by the system 102, the user device 110, or the apparatus 400 and/or one or more components thereof to backup tagged files 134 to a cloud system 160. The method 700 may be performed during the method 600, for example, between blocks 610 and 620.

At block 710, the method 700 includes detecting, by the filter of the local file system, a command to edit a tagged file within a local file system. For example, in an aspect, apparatus 400, processor 402, memory 404, and/or filter 132 may be configured to or may comprise means for detecting a command 172 to edit a tagged file 134 within a local file system 130. For example, the filter 132 may detect that the edit command 172 targets the tagged file 134 and indicates an edit or write operation.

At block 720, the method 700 includes providing a notification of the command to edit the tagged file to the cloud provider application. For example, in an aspect, apparatus 400, processor 402, memory 404, and/or file system 130 may be configured to or may comprise means for providing a notification of the command to edit the tagged file to the cloud provider application. For example, the file system 130 may provide a notification 335 of the command to edit the tagged file 134 to the cloud provider application 140.

At block 730, the method 700 includes determining, by the cloud provider application, whether to backup the tagged file in response to the notification. For example, in an aspect, apparatus 400, processor 402, memory 404, and/or cloud service cloud provider application 140 executing logic 142 may be configured to or may comprise means for determining whether to backup the tagged file in response to the notification. For example, the logic 142 may define a rule based on properties of the tagged file 134 and policies of the cloud provider application 140 whether to backup the tagged file to the cloud system 160.

FIG. 8 is a flow diagram of an example of a method 800 for analyzing a file system journal. For example, the method 800 can be performed by the system 102, the user device 110, or the apparatus 400 and/or one or more components thereof to suggest backup actions for files. The method 800 may be performed during the method 600, for example, before block 610 or between blocks 610 and 620.

At block 810, the method 800 includes periodically monitoring a local file system journal to detect respective activity rates of local files. For example, in an aspect, apparatus 400, processor 402, memory 404, and/or cloud provider application 140 may be configured to or may comprise means for periodically monitoring a local file system journal to detect respective activity rates of local files. For example, the cloud provider application 140 and/or logic 142 may monitoring the local file system journal 138 to detect respective activity rates of local files (e.g., tagged files 134 and/or untagged files 146).

At block 820, the method 800 may optionally include prioritizing the local files for backup to the cloud file system based on the respective activity rates of the local files. For example, in an aspect, apparatus 400, processor 402, memory 404, and/or cloud provider application 140 may be configured to or may comprise means for prioritizing the local files for backup to the cloud file system based on the respective activity rates of the local files. For example, the cloud provider application 140 and/or logic 142 may prioritize files with a high activity rate for upload or sync. In particular, the cloud provider application 140 and/or logic 142 may prioritize backups based on one or both of a battery level and an internet connection speed.

At block 830, the method 800 may optionally include suggesting one or more files to add to a namespace of the cloud provider application to sync with the cloud file system. For example, in an aspect, apparatus 400, processor 402, memory 404, and/or cloud provider application 140 may be configured to or may comprise means for suggesting one or more files to add to a namespace of the cloud provider application to sync with the cloud file system. For example, the cloud provider application 140 and/or logic 142 may suggest files with a high activity rate or a high predicted activity rate. The cloud provider application 140 may provide the suggestion to a user 105 directly (e.g., via a notification) or within a user application 150.

The following examples illustrate use cases of the systems and methods described herein:

Example 1: A user right clicks on a local file in a file browser application and selects an option to backup the file with the cloud system. The cloud provider application registers the file with the cloud system and puts a tag on the local file. The user makes changes to the file and a notification to client is sent to the cloud provider application. However, the user has a poor network connection and the client cannot backup the edits yet. The file may get deleted by some other application. The file system filter intercepts the delete command and the file system blocks the delete. The cloud provider application tries to back up the file when the network connection improves. Once the upload is done the delete command goes through.

Example 2: The user is already backing up a file with the cloud system. Some application deletes the file, but the cloud system is not running. The filter will intercept and start the cloud provider application, which backs up the file before deleting.

Example 3: A user is working on a file that is not being backed up by the cloud system. The cloud provider application analyzes the file system journal and finds this file with a large number of edits. The cloud provider application asks the user to back this up if they want.

Example 4: A user has backed up multiple files with the cloud service. The user is on a slow network and is making changes to multiple files. The cloud provider application analyzes the pattern of activity and other parameters such as size, name, etc. and determines file prioritization. In this case, important files will get backed up first.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus comprising: one or more memories storing computer executable instructions; and one or more processors coupled with the one or more memories and, individually or in combination, configured to: tag a file within a local file system of a device with a tag for synchronization with a cloud file system, wherein the tag includes metadata indicating a backup policy with the cloud file system and the file is outside of a cloud provider namespace; detect, at a filter of the local file system, a command to delete the tagged file based on a presence of the tag on the file; block the command on the tagged file in response to detection by the filter; provide a notification of the command to a cloud provider application; receive, in response to the notification, an approval to unblock the delete command; and perform the command to delete the tagged file in the local file system.

Clause 2. The apparatus of clause 1, wherein the one or more processors, individually or in combination, are configured to: detect, by the filter of the local file system, a command to edit the tagged file within a local file system; provide a notification of the command to edit the tagged file to the cloud provider application; and determine, by the cloud provider application, whether to backup the tagged file in response to the notification.

Clause 3. The apparatus of clause 1 or 2, wherein the one or more processors, individually or in combination, are configured to back up the file by the cloud provider application from the local file system to the cloud file system in response to the notification of the command.

Clause 4. The apparatus of any of clauses 1-3, wherein the notification to the cloud provider application starts the cloud provider application if the cloud provider application is not running.

Clause 5. The apparatus of any of clauses 1-4, wherein the one or more processors, individually or in combination, are configured to: periodically monitor a local file system journal to detect respective activity rates of local files; and prioritize the local files for backup to the cloud file system based on the respective activity rates of the local files.

Clause 6. The apparatus of any of clauses 1-5, wherein the one or more processors, individually or in combination, are configured to periodically monitor a local file system journal to suggest one or more files to add to the namespace of the cloud provider application to sync with the cloud file system.

Clause 7. The apparatus of any of clauses 1-6, wherein a backup is based on one or both of a battery level and an internet connection speed.

Clause 8. A method comprising: tagging a file within a local file system of a device with a tag for synchronization with a cloud file system, wherein the tag includes metadata indicating a backup policy with the cloud file system and the file is outside of a cloud provider namespace; detecting, by a filter of the local file system, a command to delete the tagged file based on a presence of the tag on the file; blocking the command on the tagged file in response to detection by the filter; providing a notification of the command to a cloud provider application; receiving, in response to the notification, an approval to unblock the delete command; and performing the command to delete the tagged file in the local file system.

Clause 9. The method of clause 8, further comprising: detecting, by the filter of the local file system, a command to edit the tagged file within a local file system; providing a notification of the command to edit the tagged file to the cloud provider application; and determining, by the cloud provider application, whether to backup the tagged file in response to the notification.

Clause 10. The method of clause 8 or 9, further comprising backing up the file by the cloud provider application from the local file system to the cloud file system in response to the notification of the command.

Clause 11. The method of any of clauses 8-10, wherein the notification to the cloud provider application starts the cloud provider application if the cloud provider application is not running.

Clause 12. The method of any of clauses 8-11, further comprising: periodically monitoring a local file system journal to detect respective activity rates of local files; and prioritizing the local files for backup to the cloud file system based on the respective activity rates of the local files.

Clause 13. The method of any of clauses 8-12, further comprising periodically monitoring a local file system journal to suggest one or more files to add to the namespace of the cloud provider application to sync with the cloud file system.

Clause 14. The method of any of clauses 8-13, wherein a backup is based on one or both of a battery level and an internet connection speed.

Clause 15. A non-transitory computer-readable medium storing computer-executable instructions that when executed by a processor cause a computer to: tag a file within a local file system of a device with a tag for synchronization with a cloud file system, wherein the tag includes metadata indicating a backup policy with the cloud file system and the file is outside of a cloud provider namespace; detect, at a filter of the local file system, a command to delete the tagged file based on a presence of the tag on the file; block the command on the tagged file in response to detection by the filter; provide a notification of the command to a cloud provider application; receive, in response to the notification, an approval to unblock the delete command; and perform the command to delete the tagged file in the local file system.

Clause 16. The non-transitory computer-readable medium of clause 15, further comprising instructions to: detect, at the filter of the local file system, a command to edit the tagged file within a local file system; provide a notification of the command to edit the tagged file to the cloud provider application; and determine, by the cloud provider application, whether to back up the tagged file in response to the notification.

Clause 17. The non-transitory computer-readable medium of clause 15 or 16, further comprising instructions to back up the file by the cloud provider application from the local file system to the cloud file system in response to the notification of the command.

Clause 18. The non-transitory computer-readable medium of any of clauses 15-17, wherein the notification to the cloud provider application starts the cloud provider application if the cloud provider application is not running.

Clause 19. The non-transitory computer-readable medium of any of clauses 15-18, further comprising instructions to: periodically monitor a local file system journal to detect respective activity rates of local files; and prioritize the local files for backup to the cloud file system based on the respective activity rates of the local files.

Clause 20. The non-transitory computer-readable medium of any of clauses 15-19, further comprising instructions to periodically monitor a local file system journal to suggest one or more files to add to the namespace of the cloud provider application to sync with the cloud file system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus comprising:

one or more memories storing computer executable instructions; and one or more processors coupled with the one or more memories and, individually or in combination, configured to execute the instructions to:

tag a file within a local file system of a device with a tag for synchronization with a cloud file system, wherein the tag includes metadata indicating a backup policy with the cloud file system and the file is outside of a cloud provider namespace;

detect, at a filter of the local file system and based on a presence of the tag on the file, a command to delete the tagged file;

block the command on the tagged file in response to detection by the filter;

provide a notification of the command to a cloud provider application;

receive, in response to the notification, an approval to unblock the delete command; and perform the command to delete the tagged file in the local file system, wherein the filter of the local file system intercepts the command to delete the tagged file without continuously monitoring files outside of the cloud provider namespace.

2. The apparatus of claim 1, wherein the one or more processors, individually or in combination, are configured to:

detect, by the filter of the local file system, a command to edit the tagged file within a local file system;

provide a notification of the command to edit the tagged file to the cloud provider application; and determine, by the cloud provider application, whether to backup the tagged file in response to the notification.

3. The apparatus of claim 1, wherein the one or more processors, individually or in combination, are configured to back up the file by the cloud provider application from the local file system to the cloud file system in response to the notification of the command.

4. The apparatus of claim 1, wherein the notification to the cloud provider application starts the cloud provider application if the cloud provider application is not running.

5. The apparatus of claim 1, wherein the one or more processors, individually or in combination, are configured to:

periodically monitor a local file system journal to detect respective activity rates of local files; and prioritize the local files for backup to the cloud file system based on the respective activity rates of the local files.

6. The apparatus of claim 1, wherein the one or more processors, individually or in combination, are configured to periodically monitor a local file system journal to suggest one or more files to add to the namespace of the cloud provider application to sync with the cloud file system.

7. The apparatus of claim 1, wherein a backup is based on one or both of a battery level and an internet connection speed.

8. A method comprising:

tagging a file within a local file system of a device with a tag for synchronization with a cloud file system, wherein the tag includes metadata indicating a backup policy with the cloud file system and the file is outside of a cloud provider namespace;

detecting, by a filter of the local file system and based on a presence of the tag on the file, a command to delete the tagged file;

blocking the command on the tagged file in response to detection by the filter;

providing a notification of the command to a cloud provider application;

receiving, in response to the notification, an approval to unblock the delete command; and performing the command to delete the tagged file in the local file system, wherein the filter of the local file system intercepts the command to delete the tagged file without continuously monitoring files outside of the cloud provider namespace.

9. The method of claim 8, further comprising:

detecting, by the filter of the local file system, a command to edit the tagged file within a local file system;

providing a notification of the command to edit the tagged file to the cloud provider application; and determining, by the cloud provider application, whether to backup the tagged file in response to the notification.

10. The method of claim 8, further comprising backing up the file by the cloud provider application from the local file system to the cloud file system in response to the notification of the command.

11. The method of claim 8, wherein the notification to the cloud provider application starts the cloud provider application if the cloud provider application is not running.

12. The method of claim 8, further comprising:

periodically monitoring a local file system journal to detect respective activity rates of local files; and prioritizing the local files for backup to the cloud file system based on the respective activity rates of the local files.

13. The method of claim 8, further comprising periodically monitoring a local file system journal to suggest one or more files to add to the namespace of the cloud provider application to sync with the cloud file system.

14. The method of claim 8, wherein a backup is based on one or both of a battery level and an internet connection speed.

15. A non-transitory computer-readable medium storing computer-executable instructions that when executed by a processor cause a computer to:

tag a file within a local file system of a device with a tag for synchronization with a cloud file system, wherein the tag includes metadata indicating a backup policy with the cloud file system and the file is outside of a cloud provider namespace;

detect, at a filter of the local file system and based on a presence of the tag on the file, a command to delete the tagged file;

block the command on the tagged file in response to detection by the filter;

provide a notification of the command to a cloud provider application;

receive, in response to the notification, an approval to unblock the delete command; and perform the command to delete the tagged file in the local file system, wherein the filter of the local file system intercepts the command to delete the tagged file without continuously monitoring files outside of the cloud provider namespace.

16. The non-transitory computer-readable medium of claim 15, further comprising instructions to:

detect, at the filter of the local file system, a command to edit the tagged file within a local file system;

provide a notification of the command to edit the tagged file to the cloud provider application; and determine, by the cloud provider application, whether to back up the tagged file in response to the notification.

17. The non-transitory computer-readable medium of claim 15, further comprising instructions to back up the file by the cloud provider application from the local file system to the cloud file system in response to the notification of the command.

18. The non-transitory computer-readable medium of claim 15, wherein the notification to the cloud provider application starts the cloud provider application if the cloud provider application is not running.

19. The non-transitory computer-readable medium of claim 15, further comprising instructions to:

periodically monitor a local file system journal to detect respective activity rates of local files; and prioritize the local files for backup to the cloud file system based on the respective activity rates of the local files.

20. The non-transitory computer-readable medium of claim 15, further comprising instructions to periodically monitor a local file system journal to suggest one or more files to add to the namespace of the cloud provider application to sync with the cloud file system.

* * * * *